Oct. 24, 1961 B. SCHIFFMAN Re. 25,063

AUTOMOBILE ACCESSORY

Original Filed Sept. 8, 1953

INVENTOR
BERNARD SCHIFFMAN
BY
Jackson B. Browning
ATTORNEY

United States Patent Office

Re. 25,063
Reissued Oct. 24, 1961

25,063
AUTOMOBILE ACCESSORY

Bernard Schiffman, Whitestone, N.Y.

Original No. 2,869,144, dated Jan. 20, 1959, Ser. No. 378,778, Sept. 8, 1953. Application for reissue June 17, 1959, Ser. No. 821,071
20 Claims. (Cl. 5—94)

Matter enclosed in heavy brackets [ ] appears in the original patent but forms no part of this reissue specification; matter printed in italics indicates the additions made by reissue.

This invention relates to an automobile accessory useful in adapting the rear seat area of an automobile into more efficient transportation space. [More particularly, in one embodiment the invention relates to a combination crib and play area.] *More particularly the invention relates to a multi-purpose automobile accessory which may be converted to a number of functions for use in the area between the front and rear seats of an automobile, such as a play area, crib, and a bed.*

The rear seat area of the conventional automobile is designed to accommodate comfortably two or more seated adults. While eminently satisfactory for its intended purpose, this arrangement leaves much to be desired for passengers such as infants or young children. These latter passengers, during wakefulness are denied freedom of movement by the contours and dimensions of the rear seat area. While sleeping, the infant and very young are not properly protected from injury and are in danger of rolling and falling from the seat. Utilization of the area for transporting articles is also inconvenient and inefficient. The lack of a surface that extends over the whole area renders packing and storage of the articles in the area awkward and unsatisfactory.

*It is one of the objects of the invention to provide an automobile accessory for the purpose of economically utilizing the rear seat area of an automobile for a variety of possible uses.*

It is [a principal] also an object of the invention to provide safe and comfortable sleeping accommodations in the rear seat of an automobile for infants and young children.

A further object is to provide a device which is capable of supplying the sleeping accommodations mentioned above having a variable sleeping area and utility space and which is [and] also capable of being converted into a play area covering substantially all of the rear seat area of an automobile. Still another object of the invention is to provide a device which will convert the rear seat area of an automobile into a compartment convenient and efficient for the transportation of inanimate objects.

*A still further object is to supply a device of the character defined for providing an adjustable volume enclosure which is economically constructed and which for its functions makes use of portions of the front and rear seats of an automobile.*

The manner in which these objects are accomplished will be explained with reference to the accompanying drawing.

Figure 1:
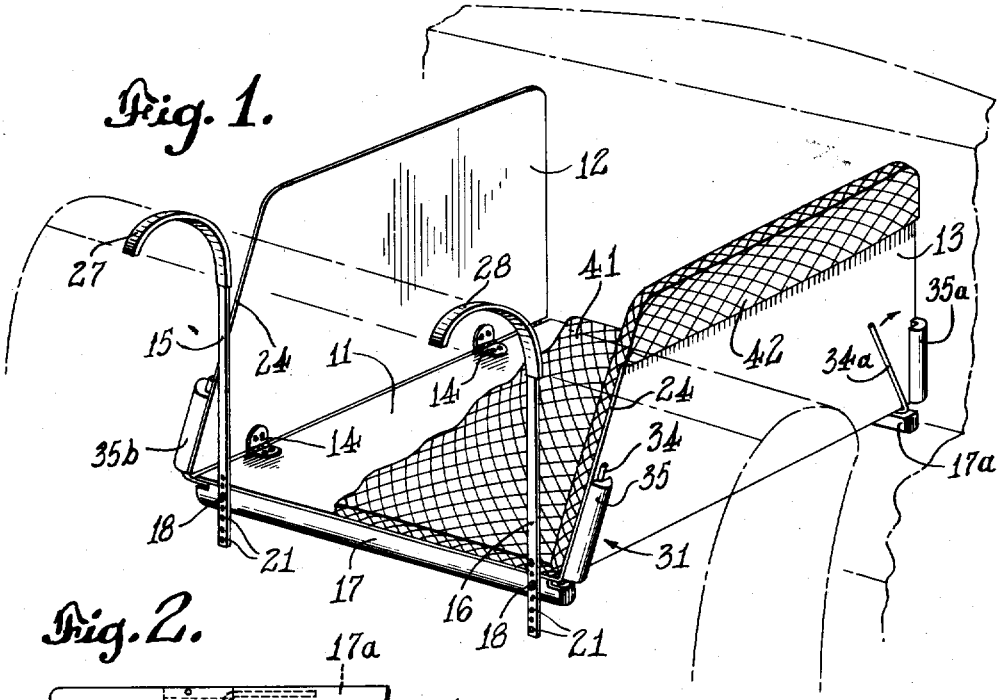
FIG. 1 is a perspective view, parts being broken away of the automobile accessory of the invention as it looks in place and functioning as a *fully erected* crib.

The preferred embodiment of the invention comprises a base piece 11 to which [is] *are* attached two side members 12 and 13. These side members 12 and 13 are attached to opposite [side] *sides* of the base piece 11 in such a manner that the side members may be rotated from the plane of the base piece [to a position substantially perpendicular to the base piece] *when fully extended thru 180° to fold thereupon.* Hinges 14 are a suitable means for attaching the side members 12 and 13 to the base piece 11 in the desired manner.

Conveniently, the base piece 11 is supported by the [hooks] *hookover arms* 15 and 16 that extend upward from the plane of the base piece and are adapted to engage the back of the front seat of an automobile. If the [hooks] *hookover arms* are of metal, as is preferred, protective jackets 27 and 28, suitably of a palstic, may be used to protect the upholstery of the automobile. The [hooks] *arms* 15 and 16 are attached, for example, by the bolts 18 and nuts 19 to a [depending] member 17 which *may be as shown extending in a downwardly direction with respect to and which* is secured to the base piece 11. A series of holes 21 in the hooks 15 and 16 permit the adjustment of these members to various heights by means of the bolts 18 and nuts 19. Legs, not shown, extending downwardly from base piece 11 are another convenient means of supporting the base piece.

Figure 2:
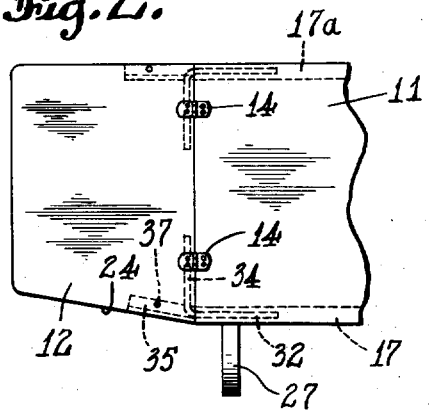
FIG. 2 is a top view of a portion of the automobile accessory of the invention as it looks when used as a play area or a storage base.
Figure 3:
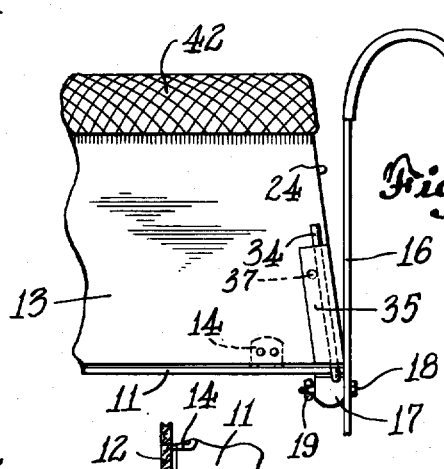
FIG. 3 is a side view, parts being broken away, of the automobile accessory of the invention shown in FIG. 1.
Figure 4:
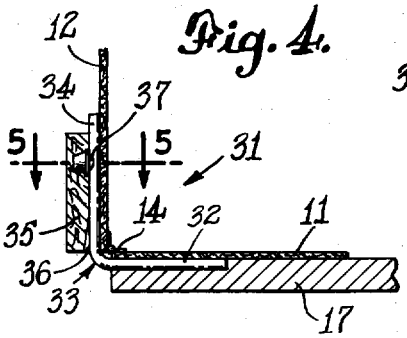
FIG. 4 is a sectional view of [one of] the [locking devices] *preferred panel sustaining mechanism* of the [preferred] automobile accessory of the invention *in the position as shown in FIG. 1.*
Figure 5:
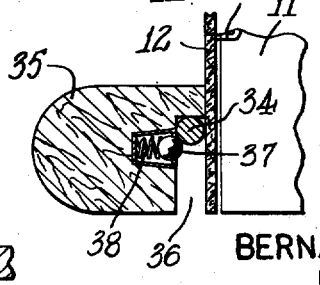
FIG. 5 is a sectional view of the [locking device] *panel sustaining mechanism* of the invention taken along line 5—5 of FIG. 4.

The side members *or side panels* 12 and 13 are adapted to be [secured in a position substantially perpendicular to the base piece 11] *sustained in certain preferred load resisting positions as shown in FIGS. 1 and 2.* A preferred means of [securing] *sustaining* the side members 12 and 13 in the *preferred positions* [prescribed position] is the [locking device] *panel sustaining mechanism* 31. In the [locking device] *mechanism* 31, one arm 32 of a right angle member 33 fits into a groove between the base piece 11 and the downwardly depending member 17 or 17a. The arm 34 of the right angle member 33 is rotatable about the arm 32 from a position substantially in the plane of the base piece 11 to a position substantially perpendicular to the base piece 11 as is indicated by the arrow on the arm 34a. [The stop] *A member 35 forming a part of the preferred mechanism 31 and mounted on side panel 13,* is provided with a groove 36 to receive the arm 34. The arm 34 is held in the groove 36 suitably by the ball 37 actuated by the spring 38 which is recessed in the stop member 35.

The downwardly depending member 17a, located near the side of the base piece 11 which is most distant from the [hooks] *arms* 15 and 16, reduces the tendency of the base piece to tip when weight is placed on the base piece 11 in the area above the member 17a. The tendency of the base piece 11 to tip under the prescribed conditions is attributable to the fact that conventional automobile seats slope downward toward the rear of the automobile. *The member 17a, apart from serving to support the main panel* 11 *on the automobile seat, also functions in part as a side panel sustaining mechanism with a right angular member similar to member 33, one arm 34a of which is shown adapted to coact with stop member 35a.*

A resilient pad 41 provides added protection for the infant or child using the automobile accessory of the invention as a crib or play area. The pad 41 is conveniently held in place by providing pockets 42 into which a portion at least of the side members 12 and 13 extend.

The side members 12 and 13 are movable separately into the same plane as that of the base piece 11. With both of the side members 12 and 13 extended horizontally, as is side member 12 in FIG. 2, substantially the whole of the rear seat area is covered. Preferably the stop 35 extends along the side member 13 to the line of intersection of side member 13 and the base member 11. When the side member 13 is lowered, stop 35 abuts depending member 17 and assists in holding side member 13 *rigid* in a substantially horizontal position. This relationship may be repeated with stops 35a and 35b and depending members 17a and 17 respectively if desired. In this manner the automobile accessory of the invention may be utilized as a play area by children or as a baggage carrier. The sloping edges 24 on the side members 12 and 13 insure the maximum utilization of the conventional rear sear area and minimize the space between the back of the front seat and the accessory of the invention.

By positioning one of the side members horizontally and the other vertically, a considerable area is made available for storage or play and the uncovered portion of the seat may be occupied by a passenger. The side members preferably may be folded inwardly upon the base member 11 to present a minimum volume when the automobile accessory of the invention is to be stored.

*One of the major advantages of the accessory of the invention is to be found in its construction which makes it possible for it to be conveniently converted from play area to a crib with both side panels up or to a youth bed with either side panel up in coaction with the front and rear seats of the automobile, the volume enclosed by the accessory and the seats being adjustable.*

In the event that the crib is not desired, certain of the advantages of the invention may be obtained by having fewer than the three plane surfaces shown in FIG. 1. For example, two plane surfaces hinged, provided with depending members and supported by hooks would serve as a play and storage area. [Other modifications of the accessory within the scope of the invention will occur to those skilled in the art. The unit may, of course, be used with or without end pieces or a covering.]

*It will also be apparent that a method and construction has been provided whereby the panel sustaining and linking mechanism makes use of certain other functional elements of the accessory for a more economical construction. Thus the depending blocks 17 and 35 which serve to increase the rigidity of the front and rear portions of the respective associated panels also serve as functional portions of the panel linkage and sustaining system, as well as serving as supporting means for the accessory as a whole with respect to the automobile. The depending blocks have been shown in specific functioning embodiments. However, it will be realized that these functions may be achieved through various modifications thereof in respect to form, number, size and location of corresponding elements.*

I claim:

1. An automobile accessory adaptable for use as a crib and play area, said accessory comprising a base member, side members mounted on opposite sides of said base member and movable with respect to said base member from a position substantially coextensive with said base member to a position above and substantially perpendicular to said base member, locking means to hold said side members perpendicular to said base member, suspending means extendable above said base member from one end of said base member and adapted to engage the upright portion of the front seat of an automobile, a depending member adjacent the other end of said base member extending below said base member, a stop extending from each of said side members and abutting said depending member when said base member and said side member are coextensive, said locking means comprising two arms substantially perpendicular to each other, one of said arms being mounted to rotate only about its own axis on said base member, the other of said arms being rotatable only about the axis of said mounted arm, a slot in said stop and a closure for said slot whereby said rotatable arm may be retained in said slot when said side member is substantially perpendicular to said base member.

2. An automobile accessory adaptable for providing a variable enclosed horizontal surface in the area between the vertical members of the front and rear automobile seats comprising a primary substantially horizontal panel adapted to rest on said rear seat having a front edge adjacent and generally parallel to said vertical front seat member, a rear edge adjacent and generally parallel to said vertical rear seat member, and a pair of side edges joining said front and rear edges; supporting means adjacent said front edge adapted to support said primary panel in cooperation with said rear seat in substantially horizontal position; a side panel pivotally mounted adjacent one side edge of said primary panel; sustaining means other than pivoting means and supported only by said panels for maintaining said side panel rigid relative to said primary panel when said side panel extends outwardly from and is in the same plane as said primary panel; and locking means to lock said side panel in substantially vertical position extending upwardly from said horizontal panel, said locking device comprising two arms angularly disposed relative to each other, one of said arms mounted to rotate only about its own axis on said primary panel, the other of said arms being rotatable only about the axis of said mounted arm in a plane immediately adjacent the outward surface of said side panel in said substantially vertical position whereby said other arm is rotatable into a locking position for said side panel.

3. An automobile accessory as claimed in claim 2 wherein said sustaining means is secured to said primary panel and cooperates with said side panel to maintain said panels rigid relative to one another.

4. An automobile accessory adaptable for providing a variable enclosed horizontal surface in the area between the vertical members of front and rear automobile seats comprising a primary substantially horizontal panel adapted to rest on said rear seat having a front edge adjacent and generally parallel to said vertical front seat member, a rear edge adjacent and generally parallel to said vertical rear seat member, and a pair of side edges joining said front and rear edges, supporting means adjacent said front edge adapted to support said primary panel in cooperation with said rear seat in substantially horizontal position; a side panel pivotally mounted adjacent one side edge of said primary panel; locking means to lock said side panel in substantially vertical position extending upwardly from said horizontal panel, said locking means comprising two arms substantially perpendicular to each other, one of said arms being mounted to rotate only about its own axis on said primary panel, the other of said arms being rotatable only about the axis of said mounted arm in a plane immediately adjacent the outward surface of said side panel in said substantially vertical position whereby said other arm is rotatable into a locking position for said side panel.

5. An automobile accessory adaptable for providing a variable enclosed horizontal surface in the area between the vertical members of the front and rear automobile seats comprising a primary substantially horizontal panel adapted to rest on said rear seat having a front edge adjacent and generally parallel to said vertical front seat member, a rear edge adjacent and generally parallel to said vertical front seat member, a rear edge adjacent and generally parallel to said vertical rear seat member, and a pair of side edges joining said front and rear edges;

supporting means engaged adjacent said front edge adapted to support said primary panel in cooperation with said rear seat in substantially horizontal position; a side panel pivotally mounted adjacent each side edge of said primary panel; a primary depending member mounted beneath said primary panel adjacent said front edge and presenting a first abutting facet parallel and adjacent to each said side edge of said primary panel; a primary stop member mounted on each said side panel and presenting a second abutting facet, said primary stop members depending from the corresponding side panels and said second facets being flush against the corresponding first facets when said side panels extend outwardly from and are in the same plane as said primary panel, a pair of locking devices to lock said side panels in substantially vertical positions extending upwardly from said horizontal panel, each said locking device comprising two arms substantially perpendicular to each other, one of said arms being mounted near the associated side on said primary panel to rotate only about its own axis, the other of said arms being rotatable only about the axis of said mounted arm, and a catch on each side panel adapted to receive and retain said other associated arm.

6. An automobile accessory as claimed in claim 5 wherein said supporting means are a pair of spaced elongated members which are attached adjacent said front edge and extend therefrom upwardly and over the top of said vertical front seat member.

7. An automobile accessory as claimed in claim 5 wherein each of said side panels is capable of pivoting through substantially 180° from a position extending outwardly from and in the same plane as said primary panel to a position substantially parallel to and above said primary panel.

8. An automobile accessory as claimed in claim 5 wherein said mounted arms are each positioned in an associated end of said primary depending member, and the catch for said other arm is provided in associated stop members.

9. An automobile accessory as claimed in claim 5 wherein said one arm extends beyond the associated side on said primary panel to also support said associated side panel when in said same plane as said primary panel.

10. An automobile accessory as claimed in claim 5 additionally comprising a secondary depending member mounted beneath said primary panel adjacent said rear edge and presenting a third abutting facet parallel and adjacent to each said side edge of said primary panel, and a secondary stop member mounted on each side panel and presenting a fourth abutting facet, said secondary stop members depending from the corresponding side panels and said fourth facets being flush against the corresponding third facets when said side panels are coextensive with and in the same plane as said primary panel.

11. An automobile accessory as claimed in claim 5 wherein said catch comprises a slot and a closure for said slot.

12. An automobile accessory as claimed in claim 10 wherein there are four sets of said locking devices, said rotatable arms being mounted in associated ends of said primary and secondary depending members and said corresponding four catches being provided in associated stop members.

13. An automobile accessory as claimed in claim 11 wherein said closure is spring actuated.

*14. A multipurpose automobile accessory having convertibility of function for use in the area between the vertical members of the front and rear automobile seats comprising the combination of a primary panel structure having a rear portion adapted to extend over the area of said rear seat, supporting means for the primary panel front portion extending from said panel adjacent said front seat to maintain said accessory in a substantially horizontal position; at least one side panel mounted along a primary panel edge other than those facing said auto front and rear seats, said side panel being pivotable thru 180° from a position overlying the primary panel to a position forming an extension of the primary panel, means for retaining the side panel in a load supporting position out of the plane of the primary panel, said means including means for sustaining the side panel in a load sustaining position substantially coplanar with the primary panel.*

*15. A multipurpose automobile accessory having convertibility of function by providing in coaction with the vertical portions of the front and rear automobile seats, a variable volume enclosure, comprising in combination panel means, means to support said panel means in a substantially horizontal position in the area between the vertical members of said front and rear seats, said panel means extending for a part thereof over the area of the rear seat, subpanels in said panel means forming a center panel structure and two side panels along edges of said center panel other than those facing the front and rear auto seats, means for pivotally fastening said side panels to said center panel for individual rotation thru 180° from a position overlying said center panel to a position wherein said subpanels form individual extensions of said center panel; and means for retaining each of said side panels in a load supporting position out of the plane of said center panel, said means including means for sustaining each of said subpanels in a load sustaining position substantially coplanar with the center panel.*

*16. A multipurpose automobile accessory having convertibility of function for use in the area between the vertical members of the front and rear automobile seats comprising the combination of a primary panel having a rear portion adapted to rest on said rear seat; one side panel each mounted along a primary panel edge other than those facing said auto front and rear seats, said side panels being individually pivotable thru 180° from a position overlying the primary panel to a position forming an extension of the primary panel; means including a structural portion of said primary panel at the edges thereof facing the front and rear auto seats for supporting the accessory in a substantially horizontal position in respect to said seats; means for retaining each of said side panels in a load supporting position out of the plane of the primary panel, said means including means for sustaining each side panel in a load supporting position substantially coplanar with the primary panel, and including part of said supporting means.*

*17. An accessory as claimed in claim 16 wherein said supporting means and said sustaining means both include a primary member each depending from and extending along the front and rear edges of said primary panel.*

*18. An accessory as claimed in claim 17 wherein said sustaining means further includes a secondary member each mounted along and depending from the edges of said panels forming extensions of said front and rear edges.*

*19. An accessory as claimed in claim 16 wherein said sustaining means includes said structural portions on said primary and each of said side panels and further elements mechanically linking each side, and said primary panel; said structural portions and said linking elements being mutually adjustable.*

*20. An accessory as claimed in claim 19 wherein said structural portions comprise a depending member on said front and rear edges of said primary and each of said side panels respectively, and said linking elements each comprise at least two portions disposed for adjustable linking action between two adjacent depending members along coextensive front and rear edges respectively of two adjacent panels.*

(References on following page)

References Cited in the file of this patent or the original patent

UNITED STATES PATENTS

| | | |
|---|---|---|
| 322,868 | Thayer | July 21, 1885 |
| 711,824 | Claflin | Oct. 21, 1902 |
| 1,060,637 | Sawyer | May 6, 1913 |
| 1,069,932 | Dupart | Aug. 12, 1913 |
| 1,081,831 | Hovorka | Dec. 16, 1913 |
| 1,105,381 | Stovall | July 28, 1914 |
| 1,238,480 | Austin | Aug. 28, 1917 |
| 2,503,602 | Titley | Apr. 11, 1950 |
| 2,606,328 | Finkle | Aug. 12, 1952 |
| 2,634,432 | Ehrenberg | Apr. 14, 1953 |
| 2,637,857 | Isaacson | May 12, 1953 |
| 2,711,545 | Moore | June 28, 1955 |

FOREIGN PATENTS

| | | |
|---|---|---|
| 458,506 | Canada | Aug. 2, 1949 |